(12) United States Patent
Ryu et al.

(10) Patent No.: US 11,926,702 B2
(45) Date of Patent: Mar. 12, 2024

(54) POLYAMIDE BLOCK COPOLYMER AND POLYAMIDE FILM INCLUDING THE SAME

(71) Applicant: LG CHEM, LTD., Seoul (KR)

(72) Inventors: Bi Oh Ryu, Daejeon (KR); Soonyong Park, Daejeon (KR); Youngseok Park, Daejeon (KR); Kwanyeol Paek, Daejeon (KR); Young Ji Tae, Daejeon (KR); Il Hwan Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 863 days.

(21) Appl. No.: 16/969,884

(22) PCT Filed: Apr. 2, 2019

(86) PCT No.: PCT/KR2019/003884
§ 371 (c)(1),
(2) Date: Aug. 13, 2020

(87) PCT Pub. No.: WO2019/194542
PCT Pub. Date: Oct. 10, 2019

(65) Prior Publication Data
US 2020/0407501 A1   Dec. 31, 2020

(30) Foreign Application Priority Data

Apr. 2, 2018   (KR) .......................... 10-2018-0038120

(51) Int. Cl.
| | |
|---|---|
| *C08G 69/32* | (2006.01) |
| *C08L 77/10* | (2006.01) |
| *B32B 27/08* | (2006.01) |
| *B32B 27/34* | (2006.01) |
| *C08J 5/18* | (2006.01) |

(52) U.S. Cl.
CPC .............. *C08G 69/32* (2013.01); *C08L 77/10* (2013.01); *B32B 27/08* (2013.01); *B32B 27/34* (2013.01); *B32B 2377/00* (2013.01); *C08J 5/18* (2013.01); *C08L 2201/10* (2013.01); *C08L 2203/16* (2013.01)

(58) Field of Classification Search
None
See application file for complete search history.

(56) References Cited

U.S. PATENT DOCUMENTS

| | | | |
|---|---|---|---|
| 5,212,258 A | 5/1993 | Irwin | |
| 8,895,677 B2 | 11/2014 | Cho et al. | |
| 2012/0238698 A1 | 9/2012 | Cho et al. | |
| 2012/0244330 A1 | 9/2012 | Sun et al. | |
| 2012/0296037 A1 | 11/2012 | Cho et al. | |
| 2014/0299264 A1 | 10/2014 | Umeda et al. | |
| 2016/0039974 A1 | 2/2016 | Sun et al. | |
| 2016/0075913 A1 | 3/2016 | Sun et al. | |
| 2016/0083538 A1 | 3/2016 | Sun et al. | |
| 2017/0022336 A1 | 1/2017 | Sun et al. | |

FOREIGN PATENT DOCUMENTS

| | | |
|---|---|---|
| CN | 105164207 A | 12/2015 |
| CN | 105367783 A | 3/2016 |
| CN | 105418915 A | 3/2016 |
| CN | 107075145 A | 8/2017 |
| EP | 0315993 A1 | 5/1989 |
| JP | 58035212 * | 8/1983 |
| JP | 59174352 * | 10/1984 |
| JP | H07-500138 A | 1/1995 |
| JP | 2006-051668 A | 2/2006 |
| JP | 2018-100395 A | 6/2018 |
| KR | 10-2011-0132068 A | 12/2011 |
| KR | 10-2012-0105720 A | 9/2012 |
| KR | 10-2012-0129319 A | 11/2012 |
| KR | 10-2014-0015492 A | 2/2014 |
| KR | 10-2015-0076676 A | 7/2015 |
| KR | 10-2015-0139836 A | 12/2015 |
| KR | 10-2016-0030862 A | 3/2016 |
| KR | 10-2016-0081613 A | 7/2016 |
| KR | 10-2017-0105477 A | 9/2017 |
| WO | 1989-04337 A1 | 5/1989 |

OTHER PUBLICATIONS

Kiya-Oglu; Effect of the Molecular Weight of Poly-para-Aramids and Structural Changes in Heat Treatment on the Mechanical Indexes oh the Fibers; Fiber Chemistry vol. 31 No. 3 (1999) pp. 208-214. (Year: 1999).*

Extended European Search Report dated Jun. 17, 2021, of the corresponding European Patent Application No. 19782002.0, 8 pages.

International Search Report and Written Opinion issued for International Application No. PCT/KR2019/003884 dated Aug. 1, 2019, 9 pages.

* cited by examiner

*Primary Examiner* — David J Buttner
(74) *Attorney, Agent, or Firm* — ROTHWELL, FIGG, ERNST & MANBECK, P.C.

(57) ABSTRACT

The present disclosure relates to a polyamide block copolymer and a polyamide film including the same.

The polyamide block copolymer according to the present disclosure makes it possible to provide a polyamide film exhibiting excellent mechanical properties while being colorless and transparent.

11 Claims, No Drawings

POLYAMIDE BLOCK COPOLYMER AND POLYAMIDE FILM INCLUDING THE SAME

CROSS-REFERENCE TO RELATED APPLICATION

This application is a 35 U.S.C. 371 National Phase Entry Application from PCT/KR2019/003884 filed on Apr. 2, 2019, designating the United States, which claims the benefit of Korean Patent Application No. 10-2018-0038120 filed on Apr. 2, 2018 with the Korean Intellectual Property Office, the disclosures of which are incorporated herein by reference in their entirety.

TECHNICAL FIELD

The present disclosure relates to a polyamide block copolymer and a polyamide film including the same.

BACKGROUND OF ART

An aromatic polyimide resin is a polymer mostly having an amorphous structure, and exhibits excellent heat resistance, chemical resistance, electrical properties, and dimensional stability due to its rigid chain structure. The polyimide resin is widely used as an electrical/electronic material.

However, the polyimide resin has many limitations in use, because it is dark brown due to the formation of a CTC (charge transfer complex) of Pi-electrons present in the imide chain.

In order to solve the limitations and obtain a colorless transparent polyimide resin, a method of restricting the movement of the Pi-electrons by introducing a strong electron attracting group such as a trifluoromethyl ($-CF_3$) group, a method of reducing the formation of the CTC by introducing a sulfone ($-SO_2-$) group, an ether ($-O-$) group, or the like into the main chain to make a bent structure, or a method of inhibiting the formation of the resonance structure of the Pi-electrons by introducing an aliphatic cyclic compound, has been proposed.

However, it is difficult for the polyimide resin according to the prior approaches to exhibit sufficient heat resistance due to the bent structure or the aliphatic cyclic compound, and a film prepared using the same still has limitations such as poor mechanical properties.

On the other hand, in recent years, polyamide copolymers having a polyamide unit structure to improve scratch resistance of the polyimide have been developed.

However, when a film is formed by coating the polyamide copolymer, the haze and yellow index are increased due to high crystallinity of the copolymer. Particularly, this phenomenon becomes severe as the film becomes thicker, so a method for improving it is required.

BRIEF SUMMARY OF THE INVENTION

The present disclosure provides a polyamide block copolymer exhibiting excellent mechanical properties while having excellent optical properties.

The present disclosure also provides a polyamide film including the polyamide block copolymer.

According to the present disclosure, a polyamide block copolymer is provided, including
A) an amide bond by an aromatic diamino group and a benzene-dicarbonyl group, and
B)
b1) a first polyamide segment, wherein a ratio of a benzene-1,3-dicarbonyl group to a total of a benzene-1,3-dicarbonyl group and a benzene-1,4-dicarbonyl group is 20 mol % or less, and
b2) a second polyamide segment, wherein a ratio of the benzene-1,3-dicarbonyl group to a total of the benzene-1,3-dicarbonyl group and the benzene-1,4-dicarbonyl group is more than 20 mol %,
C) wherein a molar ratio of the first polyamide segment to the second polyamide segment is 1:0.5 to 1:10.

According to the present disclosure, a polyamide film including the polyamide block copolymer is provided.

DETAILED DESCRIPTION OF THE INVENTION

Hereinafter, the polyamide block copolymer and the polyamide film including the same according to the exemplary embodiments of the present disclosure will be described in more detail.

The terms used are merely to refer to specific embodiments, and are not intended to restrict the present disclosure unless this is explicitly expressed.

Singular expressions of the present disclosure may include plural expressions unless it is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

According to an embodiment of the present disclosure, a polyamide block copolymer is provided, including
A) an amide bond by an aromatic diamino group and a benzene-dicarbonyl group, and
B)
b1) a first polyamide segment, wherein a ratio of a benzene-1,3-dicarbonyl group to a total of a benzene-1,3-dicarbonyl group and a benzene-1,4-dicarbonyl group is 20 mol % or less, and
b2) a second polyamide segment, wherein a ratio of the benzene-1,3-dicarbonyl group to a total of the benzene-1,3-dicarbonyl group and the benzene-1,4-dicarbonyl group is more than 20 mol %,
C) wherein a molar ratio of the first polyamide segment to the second polyamide segment is 1:0.5 to 1:10.

As a result of studies by the present inventors, when a polyamide copolymer is formed by reacting an amine moiety of an aromatic diamine monomer with a carbonyl group of a benzene-dicarbonyl-based monomer (such as phthaloyl chloride), it was confirmed that a specific combination of the benzene-1,3-dicarbonyl group (or isophthaloyl originated unit, IPC) and the benzene-1,4-dicarbonyl group (or terephthaloyl originated unit; TPC) provides a block copolymer having a different ratio of the benzene-1,3-dicarbonyl group in each segment and the copolymer can be used for a flexible display device and the like, because it does not have a large loss in strength and hardness while having a flexible structure.

According to an embodiment of the present disclosure, the polyamide block copolymer includes both I) an amide repeating unit (hereinafter referred to as a first amide repeating unit) in which an amine group of the aromatic diamine monomer and a carbonyl group of the isophthaloyl-based monomer form an amide bond, and II) an amide repeating unit (hereinafter referred to as a second amide repeating unit) in which an amine group of the aromatic diamine monomer and a carbonyl group of the terephthaloyl-based monomer form an amide bond.

In addition, the copolymer includes a plurality of segments having different compositions and physical properties, and each segment is in the form of a block copolymer including both the first amide repeating unit and the second amide repeating unit.

Among the segments of the copolymer, a segment having a ratio of the benzene-1,3-dicarbonyl group to a total of the benzene-1,3-dicarbonyl group derived from an isophthaloyl-based monomer and the benzene-1,4-dicarbonyl group derived from a terephthaloyl-based monomer of 20 mol % or less is referred to as a first polyamide segment.

In addition, among the segments of the copolymer, a segment having a ratio of the benzene-1,3-dicarbonyl group to a total of the benzene-1,3-dicarbonyl group derived from an isophthaloyl-based monomer and the benzene-1,4-dicarbonyl group derived from a terephthaloyl-based monomer of more than 20 mol % is referred to as a second polyamide segment.

Referring to the amide repeating unit described above, it can be seen that a ratio of the first amide repeating unit to a total of the first amide repeating unit and the second amide repeating unit is 20 mol % or less in the first polyamide segment, and a ratio of the first amide repeating unit to a total of the first amide repeating unit and the second amide repeating unit is more than 20 mol % in the second polyamide segment.

Herein, in the polyamide block copolymer, a molar ratio of the first polyamide segment to the second polyamide segment (or a ratio of amide repeating units) is maintained in the range of 1:0.5 to 1:10.

According to an embodiment of the present disclosure, the first polyamide segment may have a ratio of the benzene-1,3-dicarbonyl group to a total of the benzene-1,3-dicarbonyl group and the benzene-1,4-dicarbonyl group of about 2 mol % to about 20 mol %, preferably about 2 mol % to about 5 mol %.

The second polyamide segment may have the ratio of the benzene-1,3-dicarbonyl group to a total of the benzene-1,3-dicarbonyl group and the benzene-1,4-dicarbonyl group of more than about 20 mol % and about 40 mol % or less.

The repeating unit derived from the benzene-1,3-dicarbonyl group, an isophthaloyl-based monomer (IPC), may interfere with chain packing and alignment in the polymer due to bent molecular geometry. In addition, it may expand an amorphous region in the polyamide copolymer, thereby improving optical properties and folding endurance of the polyamide film.

The repeating unit derived from the benzene-1,4-dicarbonyl group, a terephthaloyl-based monomer (TPC), may maintain chain packing and alignment in the polymer due to linear molecular geometry. In addition, it may expand a crystalline region in the polyamide copolymer, thereby improving surface hardness and mechanical properties of the polyamide film.

Therefore, the first polyamide segment in which the ratio of the benzene-1,3-dicarbonyl group to a total of the benzene-1,3-dicarbonyl group and the benzene-1,4-dicarbonyl group is about 20 mol % or less may impart relatively good surface hardness and mechanical properties to the polyamide film.

In addition, the second polyamide segment in which the ratio of the benzene-1,3-dicarbonyl group to a total of the benzene-1,3-dicarbonyl group and the benzene-1,4-dicarbonyl group is more than about 20 mol % may impart relatively good optical properties and folding endurance to the polyamide film.

The polyamide copolymer of the present disclosure includes both the first polyamide segment and the second polyamide segment described above, and particularly, the ratio of the first polyamide segment to the second polyamide segment (or a ratio of amide repeating units) is maintained in the range of about 1:0.5 to about 1:10 in the entire polyamide block copolymer. Thus, advantages of each segment can be realized very effectively in the polyamide film prepared using the same.

In each segment described above, a polymerization type of the aromatic diamine group and the benzene-dicarbonyl group may be block copolymerization in which certain repeating units are alternately repeated, or random copolymerization having no specific rules for repeating.

However, the entire polyamide copolymer must be in the form of a block copolymer including the different segments in which each segment satisfies the above-described ratio of the benzene-1,3-dicarbonyl group and the benzene-1,4-dicarbonyl group.

According to an embodiment of the present disclosure, the polyamide block copolymer may have a ratio of the benzene-1,3-dicarbonyl group to a total of the benzene-1,3-dicarbonyl group and the benzene-1,4-dicarbonyl group of about 5 to about 25 mol % in the entire copolymer.

That is, since the ratio of the benzene-1,3-dicarbonyl group in the entire copolymer including all of the segments, as well as the ratio of the benzene-1,3-dicarbonyl group and the benzene-1,4-dicarbonyl group in each segment, is within the above range, the above-mentioned polyamide film may have excellent optical properties such as haze and yellow index, and at the same time, excellent mechanical properties such as folding endurance and surface hardness.

The above-mentioned aromatic diamino group may be derived from an aromatic diamine monomer containing two amino groups at the ends around the aromatic ring. For example, the aromatic diamino group may be derived from at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl) sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, and 4,4'-diaminobenzanilide.

More preferably, the aromatic diamine monomer may be 2,2'-bis(trifluoromethyl)-4,4'-biphenyldiamine (TFDB) or 2,2'-dimethyl-4,4'-diaminobenzidine.

The polyamide block copolymer according to another embodiment of the present disclosure is a carbonyl group forming an amide bond with the above-mentioned aromatic diamino group, and may further include a carbonyl group derived from an aromatic dicarbonyl monomer or a tricarbonyl monomer, in addition to the benzene-1,3-dicarbonyl group and the benzene-1,4-dicarbonyl group.

Examples of the aromatic dicarbonyl monomer include 4,4'-biphenyldicarbonyl chloride and the like, and examples of the aromatic tricarbonyl monomer include trimesoyl chloride and the like.

In particular, the aromatic tricarbonyl monomer may act as a cross-linking agent in the copolymerization to further improve mechanical properties of the polyamide block copolymer.

In order to achieve this effect, the aromatic tricarbonyl monomer may be included in an amount of about 0.01 mol % or more, about 0.025 mol % or more, or about 0.05 mol % or more, and about 5.0 mol % or less, about 2.5 mol % or less, about 1.5 mol % or less, or about 1.25 mol % or less of the total carbonyl-derived monomer.

When the aromatic tricarbonyl monomer is excessively used, optical properties of the polyamide block copolymer to be prepared may be deteriorated and flexibility may be lowered.

In the meantime, polymerization conditions for preparing the polyamide containing the amide bond by the aromatic diamino group and the benzene-dicarbonyl group by polymerizing the aromatic diamine monomer and the aromatic dicarbonyl monomer are not particularly limited. However, in order to separately form the above-described first and second polyamide segments, the polymerization may be carried out twice or more.

Specifically, the polymerization method may include the steps of:
b11) mixing a benzene-1,3-dicarbonyl monomer, a benzene-1,4-dicarbonyl monomer, and an aromatic diamine monomer,
b12) wherein the benzene-1,3-dicarbonyl monomer is included in an amount of 20 mol % or less based on a total of the benzene-1,3-dicarbonyl monomer and the benzene-1,4-dicarbonyl monomer,
b13) and then forming an amide bond between the amine group and the carbonyl group to form a first polyamide segment; and
b21) mixing a benzene-1,3-dicarbonyl monomer, a benzene-1,4-dicarbonyl monomer, and an aromatic diamine monomer,
b22) wherein the benzene-1,3-dicarbonyl monomer is included in an amount of more than 20 mol % based on a total of the benzene-1,3-dicarbonyl monomer and the benzene-1,4-dicarbonyl monomer,
b23) and then forming an amide bond between the amine group and the carbonyl group to form a second polyamide segment,
wherein the ratio of the monomers may be controlled such that the molar ratio of the first polyamide segment to the second polyamide segment is 1:0.5 to 1:10.

The polymerization reaction for forming the polyamide may be carried out by solution polymerization under an inert gas atmosphere at a temperature of about minus 25° C. to about 25° C., more preferably about minus 25° C. to 0° C. Specific examples of the above-mentioned monomers and the like are as described above in the polyamide block copolymer.

Herein, as the reaction solvent, N,N-dimethylformamide, N,N-dimethylacetamide, dimethyl sulfoxide, acetone, N-methyl-2-pyrrolidone, tetrahydrofuran, chloroform, gamma-butyrolactone, or the like may be used.

According to an embodiment of the present disclosure, the polyamide block copolymer may have a weight average molecular weight of about 10,000 to about 700,000 g/mol, about 10,000 to about 500,000 g/mol, about 100,000 to about 500,000 g/mol, or about 300,000 to about 450,000 g/mol.

Herein, the weight average molecular weight may be measured by gel permeation chromatography (GPC).

According to another embodiment of the present disclosure, a film including the above-mentioned polyamide block copolymer is provided.

When a film is prepared using the above-mentioned polyamide block copolymer, flexibility as well as excellent optical and mechanical properties may be exhibited, and thus the film can be used as a material for various molded articles.

For example, the polyamide film may be applied to a substrate for a display, a protective film for a display, a touch panel, a window cover of a foldable device, or the like.

The polyamide film may be prepared by a conventional method such as a dry method or a wet method using the polyamide block copolymer.

For example, the polyamide film may be obtained by coating a solution containing the copolymer on an arbitrary support to form a film, and drying the film by evaporating solvents. If necessary, stretching and heat treatment for the polyamide film may be carried out.

The polyamide film may exhibit excellent mechanical properties while being colorless and transparent, because it is prepared using the above-described polyamide copolymer.

Specifically, the polyamide film may have haze with respect to a specimen having a thickness of 50±2 μm measured according to ASTM D 1003 of about 1.0% or less, or about 0.85% or less.

In addition, the polyamide film may have yellow index (YI) with respect to a specimen having a thickness of 50±2 μm measured according to ASTM E 313 of about 3.0 or less, or about 2.85 or less.

In addition, the polyamide film may have a modulus measured according to ISO 527-3 of about 6.5 GPa or more, preferably about 7.0 GPa or more.

In addition, the polyamide film may have elongation measured according to ISO 527-3 of about 10% or more, preferably about 14% or more.

In addition, the polyamide film may have pencil hardness with respect to a specimen having a thickness of 50±2 μm measured according to ASTM D3363 of 2H or more.

According to another embodiment of the present disclosure, a resin laminate is provided, including a substrate; and a polymer resin layer including the above-described polyamide block copolymer.

Herein, the polymer resin layer may be formed on one surface or both surfaces of the substrate, and may further include a separate functional layer on the polymer resin layer or between the substrate and the polymer resin layer.

The substrate may include at least one polymer selected from the group consisting of polyimide-based, polycarbonate-based, polyester-based, polyalkyl(meth)acrylate-based, polyolefin-based, and polycyclicolefin-based polymers.

Advantageous Effects

The polyamide block copolymer according to the present disclosure makes it possible to provide a polyamide film exhibiting excellent mechanical properties while being colorless and transparent.

MODE FOR INVENTION

Hereinafter, preferred examples are provided for better understanding.

However, these examples are for illustrative purposes only, and the invention is not intended to be limited by these examples.

Preparation of Polyamide Block Copolymer

Example 1: Multi-Segment

In a 500 mL 4-neck round-bottom flask (reactor) equipped with a stirrer, a nitrogen injector, a dropping funnel, and a temperature controller, 184 g of N,N-dimethylacetamide (DMAc) was placed while slowly blowing nitrogen. The temperature of the reactor was adjusted to −10° C., and then 0.030343 mol of 2,2'-bis(trifluoromethyl)-4,4'-biphenyldiamine (TFDB) was dissolved.

0.000759 mol of isophthaloyl chloride (IPC) and 0.014716 mol of terephthaloyl chloride (TPC) were sequentially added thereto at about 5-minute intervals, and stirred. Thereafter, an amide formation reaction was carried out at about −10° C. for about 60 minutes.

(First Segment)

After 0.030343 mol of TFDB was added thereto and dissolved, 0.005007 mol of IPC and 0.010468 mol of TPC were sequentially added thereto at about 5-minute intervals, and stirred. Thereafter, an amide formation reaction was carried out at about −10° C. for about 60 minutes.

(Second Segment)

After completion of the reaction, DMAc was added to dilute to a solid content of 5% or less, and then precipitated using 1 L of methanol. The precipitated solid was filtered and then dried at 100° C. under vacuum for about 6 hours or more to obtain a polyamide block copolymer in the form of solid.

(weight average molecular weight: about 417,201 g/mol)

Example 2: Multi-Segment

A polyamide block copolymer in the form of solid was obtained in the same manner as in Example 1, except that the amounts of reactants added were changed as shown in Table 1 below.

(weight average molecular weight: about 401,117 g/mol)

Example 3: Multi-Segment

A polyamide block copolymer in the form of solid was obtained in the same manner as in Example 1, except that the amounts of reactants added were changed as shown in Table 1 below.

(weight average molecular weight: about 402,121 g/mol)

Comparative Example 1: Mono-Segment

In a 500 mL 4-neck round-bottom flask (reactor) equipped with a stirrer, a nitrogen injector, a dropping funnel, and a temperature controller, 184 g of N,N-dimethylacetamide (DMAc) was placed while slowly blowing nitrogen. The temperature of the reactor was adjusted to −10° C., and then 0.030343 mol of 2,2'-bis(trifluoromethyl)-4,4'-biphenyldiamine (TFDB) was dissolved.

0.001517 mol of isophthaloyl chloride (IPC) and 0.029432 mol of terephthaloyl chloride (TPC) were sequentially added thereto at about 5-minute intervals, and stirred. Thereafter, an amide formation reaction was carried out at about −10° C. for about 60 minutes.

After completion of the reaction, DMAc was added to dilute to a solid content of 5% or less, and then precipitated using 1 L of methanol. The precipitated solid was filtered and then dried at 100° C. under vacuum for about 6 hours or more to obtain a polyamide block copolymer in the form of a solid.

(weight average molecular weight: about 431,122 g/mol)

Comparative Example 2: Mono-Segment

A polyamide block copolymer in the form of solid was obtained in the same manner as in Comparative Example 1, except that the amounts of reactants added were changed as shown in Table 1 below.

(weight average molecular weight: about 399,721 g/mol)

Comparative Example 3: Mono-Segment

A polyamide block copolymer in the form of a solid was obtained in the same manner as in Comparative Example 1, except that the amounts of reactants added were changed as shown in Table 1 below.

(weight average molecular weight: about 392,845 g/mol)

The amounts of the respective components in the preparation of the polyamide block copolymers of the examples and comparative examples are summarized in Table 1 below.

Preparation of Polyamide Film

Each of the polyamide block copolymers obtained in the examples and comparative examples was dissolved in N,N-dimethylacetamide to prepare a polymer solution of about 12% (w/V).

The polymer solution was applied on a polyimide-based substrate (UPILEX-75s, manufactured by UBE), and the thickness of the polymer solution was uniformly controlled using a film applicator.

This was dried in a Mathis oven at about 80° C. for about 15 minutes, cured at about 250° C. for about 30 minutes while flowing nitrogen, and then peeled from the substrate to obtain a polyamide film having a thickness of 50.0 μm.

TABLE 1

| | Segment | IPC (mol) | TPC (mol) | TFDB (mol) | IPC (mol %) | TPC (mol %) |
|---|---|---|---|---|---|---|
| Ex. 1 | First segment | 7.5900E−04 | 1.4716E−02 | 0.03034 | 4.905 | 95.095 |
| | Second segment | 5.0070E−03 | 1.0468E−02 | 0.03034 | 32.355 | 67.645 |
| Ex. 2 | First segment | 1.9000E−04 | 3.6790E−03 | 0.00379 | 4.911 | 95.089 |
| | Second segment | 5.5750E−03 | 2.1505E−02 | 0.02650 | 20.587 | 79.413 |
| Ex. 3 | First segment | 7.7000E−04 | 1.4330E−02 | 0.01541 | 5.099 | 94.901 |
| | Second segment | 4.4685E−03 | 1.0632E−02 | 0.01541 | 29.592 | 70.408 |
| Comp. Ex. 1 | — | 1.5170E−03 | 2.9432E−02 | 0.03034 | 4.902 | 95.098 |
| Comp. Ex. 2 | — | 1.0013E−02 | 2.0936E−02 | 0.03034 | 32.353 | 67.647 |
| Comp. Ex. 3 | — | 5.7650E−03 | 2.5184E−02 | 0.03034 | 18.627 | 81.373 |

EXPERIMENTAL EXAMPLES

The following properties were measured or evaluated for the polyamide films of the examples and comparative examples, and the results are summarized in Table 2 below.

Yellow Index (Y.I.): The yellow index (Y.I.) of the film was measured according to the method of ASTM E 313 using a COH-400 Spectrophotometer (NIPPON DENSHOKU INDUSTRIES).

Haze: The haze of the film was measured according to the method of ASTM D 1003 using a COH-400 Spectrophotometer (NIPPON DENSHOKU INDUSTRIES).

Pencil hardness: The pencil hardness of the film was measured according to the method of ASTM D3363 using a Pencil Hardness Tester.

Specifically, pencils of varying hardness values were fixed to the tester and scratched on the film, and the degree of occurrence of scratches on the film was observed with the naked eye or with a microscope. When more than 70% of the total number of scratches was not observed, a value corresponding to the hardness of the pencil was evaluated as the pencil hardness of the film.

Table 2 shows the number of times (5 times in total) the film was scratched with a pencil of the corresponding hardness in the test and the number of scratches occurred therein.

Modulus and elongation: The modulus (GPB) and elongation (%) of the film were measured according to the method of ISO 527-3 using Universal Testing Systems (Instron® 3360).

Folding endurance: The folding endurance of the film was measured according to the method of ISO 5626 using a folding endurance tester.

Specifically, a specimen (1 cm×7 cm) of the film was loaded into the folding endurance tester at 25° C., and folded to an angle of 135 at a rate of 175 rpm on the left and right sides of the specimen, with a radius of curvature of 0.8 mm and a load of 250 g, until the specimen was fractured. The number of reciprocating bending cycles was measured as the folding endurance.

TABLE 2

|  | YI | Haze | Pencil hardness | Modulus (GPa) | Elongation (%) | MIT (0.8 R) |
|---|---|---|---|---|---|---|
| Ex. 1 | 2.41 | 0.63 | 2~3H | 7.15 | about 15 | about 9,000 cycles |
| Ex. 2 | 2.81 | 0.82 | 3H | 7.21 | about 15 | about 9,000 cycles |
| Ex. 3 | 3.79 | 0.81 | 2~3H | 7.11 | about 15 | about 9,000 cycles |
| Comp. Ex. 1 | 6.12 | 2.23 | 3H | 7.77 | about 10 | about 7,000 cycles |
| Comp. Ex. 2 | 2.54 | 0.38 | F | 6.24 | about 15 | about 9,000 cycles |
| Comp. Ex. 3 | 2.63 | 0.88 | 2~3H | 6.78 | about 10 | about 8,000 cycles |

Referring to the table above, it was confirmed that the polyamide films according to the examples had excellent mechanical properties such as high pencil hardness, modulus, and elongation, as well as excellent optical properties such as low haze and low yellow index. Further, it was also confirmed that the films exhibited very high folding endurance.

Accordingly, the polyamide film according to the embodiment of the present disclosure is considered to be applicable to a foldable display or the like.

The invention claimed is:

1. A polyamide block copolymer, comprising
   A) an amide bond by an aromatic diamino group and a benzene-dicarbonyl group, and
   B)
   b1) a first polyamide segment, wherein a ratio of a benzene-1,3-dicarbonyl group to a total of the benzene-1,3-dicarbonyl group and a benzene-1,4-dicarbonyl group is 2 mol % to 20 mol %, and
   b2) a second polyamide segment, wherein a ratio of the benzene-1,3-dicarbonyl group to a total of the benzene-1,3-dicarbonyl group and the benzene-1,4-dicarbonyl group is more than 20 mol % and 40 mol % or less,
   C) wherein a molar ratio of the first polyamide segment to the second polyamide segment is 1:0.5 to 1:10.

2. The polyamide block copolymer of claim 1, wherein the polyamide block copolymer has a ratio of the benzene-1,3-dicarbonyl group to a total of the benzene-1,3-dicarbonyl group and the benzene-1,4-dicarbonyl group is 5 to 25 mol %.

3. The polyamide block copolymer of claim 1,
   wherein the aromatic diamino group has a diamino group derived from at least one selected from the group of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, and 4,4'-diaminobenzanilide.

4. The polyamide block copolymer of claim 1,
   wherein the polyamide block copolymer has a weight average molecular weight is 10,000 to 700,000 g/mol.

5. A polyamide film comprising the polyamide block copolymer of claim 1.

6. The polyamide film of claim 5,
   wherein the polyamide film has a haze value of 1.0 or less as measured according to ASTM D 1003.

7. The polyamide film of claim 5,
   wherein the polyamide film has a yellow index value of 3.0 or less as measured according to ASTM E 313.

8. The polyamide film of claim 5,
   wherein the polyamide film has a modulus of at least 6.5 as measured according to ISO 527-3.

9. The polyamide film of claim 5,
   wherein the polyamide film has an elongation of at least 10% as measured according to ISO 527-3.

10. A resin laminate comprising:
    a substrate; and
    a polymer resin layer comprising the polyamide block copolymer of claim 1.

11. The resin laminate of claim 10,
    wherein the substrate comprises at least one polymer selected from the group of polyimide-based polymer, polycarbonate-based polymer, polyester-based polymer, polyalkyl(meth)acrylate-based polymer, polyolefin-based polymer, and polycyclicolefin-based polymer.

* * * * *